No. 12,755.

REISSUED FEB. 25, 1908.

J. S. CHAMBERS.

THROTTLE VALVE.

APPLICATION FILED FEB. 19, 1907.

2 SHEETS—SHEET 1.

Witnesses:
Gustave Browne.
Henry Thieme.

Inventor
John S. Chambers
by attorneys
Brown & Seward

No. 12,755.

REISSUED FEB. 25, 1908.

J. S. CHAMBERS.

THROTTLE VALVE.

APPLICATION FILED FEB. 19, 1907.

2 SHEETS—SHEET 2.

Witnesses:
Gustave Browne
Henry Thieme

Inventor
John S. Chambers
by attorneys
Brown & Seward

UNITED STATES PATENT OFFICE.

JOHN S. CHAMBERS, OF WILMINGTON, NORTH CAROLINA.

THROTTLE-VALVE.

No. 12,755. Specification of Reissued Letters Patent. Reissued Feb. 25, 1908.

Original No. 816,217, dated March 27, 1906, Serial No. 254,947. Application for reissue filed February 19, 1907. Serial No. 358,334.

*To all whom it may concern:*

Be it known that I, JOHN S. CHAMBERS, a citizen of the United States, and a resident of Wilmington, in the county of New Hanover and State of North Carolina, have invented a new and useful Improvement in Throttle-Valves, of which the following is a specification.

My invention relates to an improvement in throttle valves and has for its object to provide means projecting into the stand pipe to a point beneath a valve for opening and closing the same.

A further object is to provide a device in which the movement of the means for opening the valve is increased after the valve has been started from its seat so as to insure a rapid opening of the valve.

A still further object is to provide certain improvements in the construction, form and arrangement of the several parts whereby the valve may be operated in a very simple and easy manner.

Figure 1:
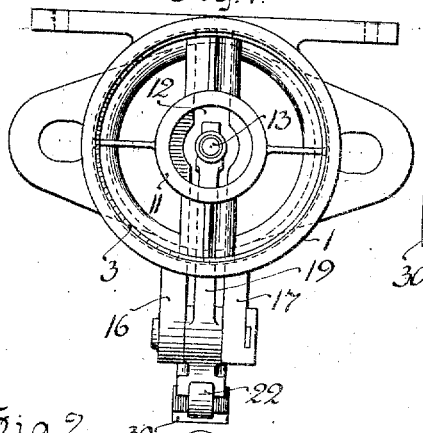
Figure 3:
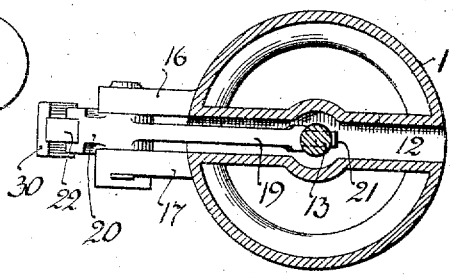
Figure 2:
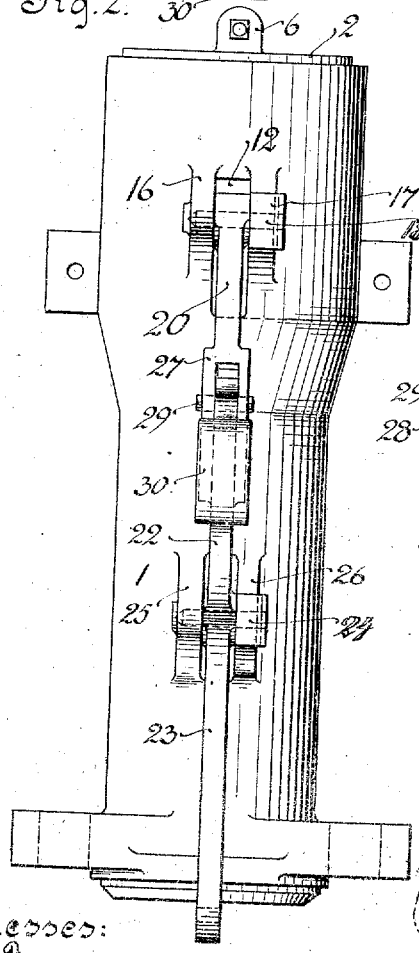
Figure 4:
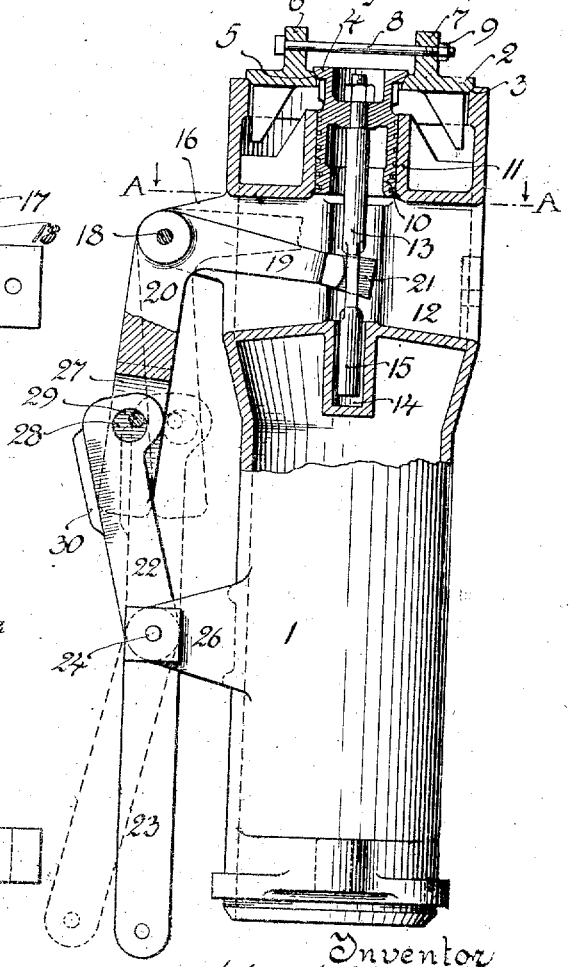
Figure 5:
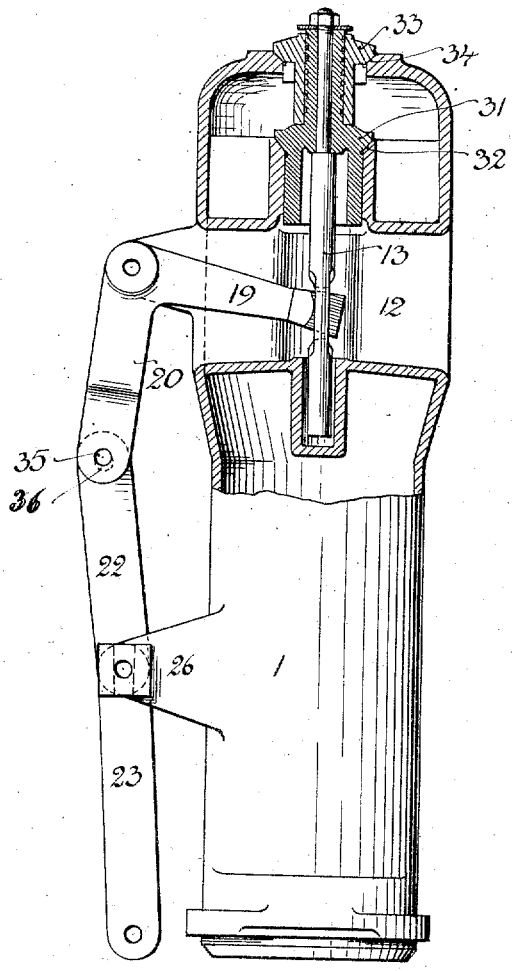
Figure 6:
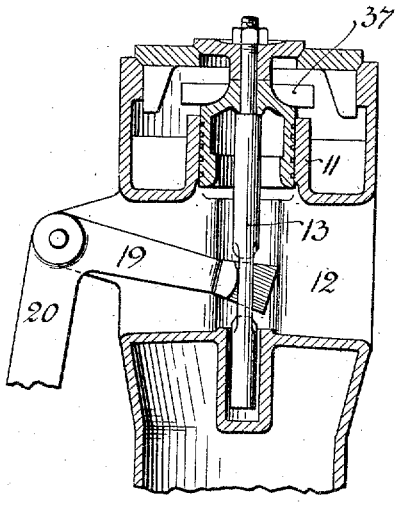

A practical embodiment of the invention is represented in the accompanying drawings in which Figure 1 represents the stand pipe and valve in top plan, Fig. 2 is a side view of the same, Fig. 3 is a cross section taken in the plane of the line A—A of Fig. 4, Fig. 4 is a view in side elevation partially in section taken in the plane at right angles to Fig. 2, Fig. 5 is a view in side elevation partially in section of a modified form of throttle valve, and Fig. 6 is a detail vertical central section showing a third form of throttle valve.

The stand pipe is denoted by 1 and is herein shown as straight and arranged vertically. In the form shown in Figs. 1 to 4 inclusive, the throttle valve comprises an outer valve 2 having its seat 3 on the top of the stand pipe and an inner valve 4 having its seat 5 at the center of the outer valve 2. The outer valve 2 is provided on its top with two lugs 6 and 7 arranged diametrically opposite. A cross-bar or bolt 8 engages the two lugs and is removably held in position by means of a nut 9. This bar is so arranged that after the inner valve 4 has been raised a short distance it will engage the bar and lift the outer valve 2 with it the remaining portion of its movement.

The inner valve 4 is provided with a piston 10 which is fitted to slide in a centrally arranged cylinder 11 uprising from the chamber 12 which extends entirely through the stand pipe, the interior of said chamber being in free open communication with the interior of the steam dome within which the stand pipe is supposed to stand and closed to the interior of the stand pipe save through the valve opening in its wall. This admits of free access to a point within the peripheral plane of the stand pipe for attaching the operating lever to the valve rod without working through the wall of the stand pipe. The inner valve 4 is further provided with a valve rod 13 which depends therefrom. The rod 13 is guided in its reciprocating movements by providing a cylindrical socket 14 extending downwardly from the chamber 12, within which socket the lower end 15 of the valve rod is located.

The stand pipe is provided with two outwardly projecting lugs 16, 17, upon opposite sides of the chamber 12, between which lugs is pivoted at 18, a two-armed rocking lever 19, 20. The arm 19 of this rocking lever extends into the chamber 12 and its free end is engaged with the inner valve rod 13. In the present instance, this engagement is arranged by forming a tongue 21 on the end of the arm 19, which tongue is inserted through the valve rod.

An operating lever 22, 23, is pivoted at 24 between two lugs 25, 26, projecting outwardly from the stand pipe 1 at a short distance below the rocking lever supporting lugs 16, 17. The operating lever 22, 23, may be rocked by any suitable mechanism, not shown herein, which may be attached to the lower arm 23 of said lever. The upper arm 22 of the operating lever is connected to the lower arm 20 of the rocking lever as follows. The arm 20 of the rocking lever is bifurcated forming a recess 27, into which recess the upper end of the arm 22 of the operating lever extends. A hole 28 is formed in the lever arm 22 through which hole a small pin 29 passes, which pin is secured to the lever arm 22. The relative diameters of the pin 29 and the hole 28 are such that when the lever arm 22 is rocked inwardly, the pin 29 will not be engaged by the wall of the hole 28 until the arm 22 has been moved a short distance. The lever arm 22 is further provided with a lateral flange 30 which engages the extreme end of the lever arm 20 at a point a short distance below the pin and hole connection 29, 28, when the lever arms 20 and 22 are at or near the limits of their outward movements.

In operation, when it is desired to open communication to the interior of the stand-pipe, the operating lever is rocked in position to move the arm 22 inwardly. This arm because of the engagement of its flange 30 with the free end of the arm 20 of the rocking lever, will move the arm 20 inwardly, thus moving the arm 19 upwardly and with it the inner valve 4. During the first part of this movement a great advantage of leverage is obtained because of the engagement of the arm 22 of the operating lever when it is pivoted with the arm 20 at the greatest distance from its pivot. After the inner valve has been started from its seat and the arms 22 and 20 are rocked inwardly a short distance, the outer wall of the hole 28 will engage the pin 29, thus shifting the leverage toward the pivot of the rocking lever 20. The continued inward movement of the arms 22 and 20 may be accelerated because of this shifting of leverage. This will accelerate the movement of the inner valve 4 and because of its engagement with the rod 8 of the outer valve will also rapidly lift the outer valve from its seat.

In the form shown in Fig. 5, I have shown a double valve, the lower member being denoted by 31, its seat by 32 and the outer member by 33 and its seat by 34. In this instance, both the members 31 and 33 of the valve are raised simultaneously. In this form I have shown the operating lever as connected to the rocking lever by a pin and elongated slot connection 35, 36. In this form also, the steam may be admitted to the interior of the stand pipe downwardly between the valve member 33 and its seat 34 and upwardly between the valve member 31 and its seat 32 when the valve is open.

In the form shown in Fig. 6, the inner valve is shown as provided with wings 37 spaced a short distance beneath the outer valve, which wings are arranged to engage the bottom of the outer valve and raise it after the inner valve has been started from its seat.

What I claim is:

1. In a stand pipe, a valve, its seat, and means for opening and closing the valve arranged to automatically reduce its leverage and thereby increase the movement of the valve after it has been started from its seat.

2. In a stand pipe, inner and outer valves, their seats, and means for opening and closing the valves arranged to automatically reduce its leverage and thereby raise the valve rapidly after the inner valve has been started from its seat.

3. In a vertical stand pipe, inner and outer valves, their seats, an inner valve rod, a rocking lever engaging the inner valve rod at a point within the stand pipe beneath the inner valve and means for operating the rocking lever to primarily lift the inner valve and secondarily lift the outer valve.

4. In a stand pipe, a valve, a seat therefor, a valve rod, a rocking lever engaging the rod and an operating lever arranged to shift its connection with the rocking lever after the valve has been started from its seat to increase the movement of the valve.

5. In a stand pipe, inner and outer valves, their seats, an inner valve rod, a rocking lever engaging the same, and an operating lever arranged to shift its connection with the rocking lever to increase its speed after the inner valve has been started from its seat.

6. In a stand pipe provided with a chamber extending laterally therein and permanently open to the exterior of the stand pipe and normally closed to the interior of the stand pipe, a valve in the wall of the chamber provided with a valve operating rod extending into the chamber and an operating lever connected with the rod of said valve within said chamber.

7. In a throttle-valve construction, the combination of a supply-pipe having a concentric steam-chamber at one end thereof, an open-ended chamber extending into said pipe adjacent to said steam-chamber, a throttle-valve disposed in said steam-chamber, and means extending into said open-ended chamber for moving said valve longitudinally of the end of the supply-pipe.

In testimony whereof that I claim the foregoing as my invention, I have signed my name in the presence of two witnesses this 14th day of Feb., 1907.

JOHN S. CHAMBERS.

Witnesses:
J. CHAMBERS,
J. P. WINGO, Jr.